(12) United States Patent
Lucas et al.

(10) Patent No.: US 11,214,374 B2
(45) Date of Patent: Jan. 4, 2022

(54) SEAT TRACK ASSEMBLIES FOR VIBRATION ISOLATION OF FLOOR MOUNTED COMPONENTS

(71) Applicant: Gulfstream Aerospace Corporation, Savannah, GA (US)

(72) Inventors: Michael Lucas, Savannah, GA (US); Kristopher P. Lynch, Savannah, GA (US); Benjamin Frank Wilson, Savannah, GA (US); Jeffrey Jonas, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 718 days.

(21) Appl. No.: 15/658,140

(22) Filed: Jul. 24, 2017

(65) Prior Publication Data

US 2018/0029714 A1 Feb. 1, 2018

Related U.S. Application Data

(60) Provisional application No. 62/369,703, filed on Aug. 1, 2016.

(51) Int. Cl.
*B64D 11/06* (2006.01)

(52) U.S. Cl.
CPC ...... *B64D 11/0619* (2014.12); *B64D 11/0696* (2013.01)

(58) Field of Classification Search
CPC . B64D 11/0619; B64D 11/0696; B64D 11/06; F16F 1/3732; F16F 1/3735; F16F 1/3737; F16F 13/10
See application file for complete search history.

(56) References Cited

U.S. PATENT DOCUMENTS

| 2,103,480 A | * | 12/1937 | Mason | B66B 7/047 |
| | | | | 187/409 |
| 2,490,652 A | * | 12/1949 | Sahlin | B66B 7/047 |
| | | | | 187/409 |

(Continued)

FOREIGN PATENT DOCUMENTS

| CN | 202264657 U | 6/2012 |
| DE | 102007058207 B3 | 5/2009 |

(Continued)

OTHER PUBLICATIONS

USPTO, Office Action in U.S. Appl. No. 14/495,667 dated Mar. 8, 2018.

(Continued)

*Primary Examiner* — Medhat Badawi
(74) *Attorney, Agent, or Firm* — LKGlobal | Lorenz & Kopf, LLP

(57) ABSTRACT

Aircraft, vibration isolation assemblies, and methods of assembling vibration isolation assemblies are provided. An aircraft includes a vibration isolation assembly. The vibration isolation assembly includes a mounting track, a plate, a clamp block, a vibration isolator, and a support fitting. The mounting track defines a cavity and includes flanges that define an opening to the cavity. The plate is configured to be positioned on the flanges outside of the cavity. The clamp block is configured to be fastened to the plate under the flanges of the mounting track within the cavity. The vibration isolator is configured to be laterally constrained by the clamp block within the cavity. The support fitting is configured to be secured to the vibration isolator outside of the cavity.

15 Claims, 7 Drawing Sheets

(56) References Cited

U.S. PATENT DOCUMENTS

| | | | | |
|---|---|---|---|---|
| 2,736,272 A * | 2/1956 | Elsner | A47B 91/08 | 410/105 |
| 3,713,616 A * | 1/1973 | Bowers | B60P 7/0815 | 410/105 |
| 4,196,775 A * | 4/1980 | Groh | H01L 23/473 | 165/168 |
| 4,273,487 A * | 6/1981 | McLennan | B61D 45/00 | 410/105 |
| 4,598,798 A * | 7/1986 | Koppensteiner | B66B 7/048 | 187/409 |
| 4,602,756 A * | 7/1986 | Chatfield | A61G 7/0503 | 248/222.14 |
| 4,771,969 A * | 9/1988 | Dowd | B64D 11/0696 | 244/118.6 |
| 4,796,837 A * | 1/1989 | Dowd | B64D 11/0696 | 244/122 R |
| 4,878,640 A * | 11/1989 | Fricker | E04B 1/4107 | 248/297.21 |
| 4,936,527 A * | 6/1990 | Gorges | B64C 1/20 | 104/165 |
| 5,083,726 A * | 1/1992 | Schurr | B64D 11/0696 | 244/118.6 |
| 5,178,345 A * | 1/1993 | Peltola | B64D 11/0693 | 244/118.6 |
| 5,295,671 A * | 3/1994 | Nakagaki | F16F 13/10 | 248/638 |
| 5,383,630 A * | 1/1995 | Flatten | B64D 11/06 | 244/118.6 |
| 5,636,826 A * | 6/1997 | Nakagaki | F16F 7/00 | 248/224.51 |
| 5,673,973 A * | 10/1997 | Marechal | B60N 2/062 | 297/257 |
| 5,979,884 A * | 11/1999 | Sato | F16F 15/023 | 267/140.13 |
| 6,193,453 B1 * | 2/2001 | Kernkamp | B64D 9/003 | 410/77 |
| 6,533,490 B2 * | 3/2003 | Kincaid | B60G 7/005 | 403/133 |
| 6,619,588 B2 * | 9/2003 | Lambiaso | B64D 11/0015 | 244/118.5 |
| 6,695,295 B2 * | 2/2004 | Williams | B29C 45/14491 | 267/140.13 |
| 6,695,296 B1 * | 2/2004 | Runge | F16F 1/373 | 248/628 |
| 6,695,379 B1 * | 2/2004 | Ishida | B60N 2/002 | 180/273 |
| 7,029,215 B2 * | 4/2006 | Dowty | B64D 11/0696 | 410/102 |
| 7,232,094 B2 * | 6/2007 | Bishop | B60N 2/01575 | 244/118.6 |
| 7,232,096 B1 * | 6/2007 | Ahad | B64D 11/0696 | 244/118.6 |
| 7,234,619 B2 * | 6/2007 | Hicks | B60N 3/00 | 224/281 |
| 7,316,389 B2 * | 1/2008 | Rawson | F16F 1/3732 | 267/141.5 |
| 7,370,832 B2 * | 5/2008 | Frantz | B64C 1/20 | 244/118.6 |
| 7,404,537 B2 * | 7/2008 | Schrimpl | B60N 2/06 | 248/424 |
| 7,410,127 B1 * | 8/2008 | Ahad | B64D 11/0696 | 244/118.5 |
| 7,695,225 B2 * | 4/2010 | Pozzi | B60N 2/0825 | 410/104 |
| 8,141,946 B2 * | 3/2012 | Kramer | B64D 11/06395 | 244/118.6 |
| 8,182,183 B2 * | 5/2012 | Cook | B60N 2/01558 | 244/118.1 |
| 8,528,860 B2 * | 9/2013 | VanderWolk | B64D 11/0696 | 244/118.5 |
| 8,628,053 B2 * | 1/2014 | Marechal | B64D 11/0696 | 244/118.5 |
| 8,668,181 B2 * | 3/2014 | Dazet | B60P 7/0807 | 244/118.1 |
| 8,757,578 B2 * | 6/2014 | Kitamura | B60N 2/07 | 248/430 |
| 8,777,193 B2 * | 7/2014 | Loret de Mola | F16B 5/01 | 267/141.5 |
| 8,857,763 B2 * | 10/2014 | Brand | B60N 2/14 | 244/118.5 |
| 8,944,378 B2 * | 2/2015 | Bishop | B64D 11/0696 | 244/118.1 |
| 9,284,056 B2 * | 3/2016 | Mejuhas | B64D 11/0696 | |
| 9,476,447 B2 * | 10/2016 | Schmidt | F16C 11/0633 | |
| 9,550,436 B2 * | 1/2017 | Fenton | A61G 3/0808 | |
| 9,669,934 B2 * | 6/2017 | Mejuhas | B60N 2/01575 | |
| 9,738,402 B2 * | 8/2017 | Brown | B64D 9/00 | |
| 9,828,102 B2 * | 11/2017 | Baumann | B60N 2/01575 | |
| 9,878,639 B2 * | 1/2018 | Sawdy | B60N 2/01525 | |
| 10,259,585 B2 * | 4/2019 | Sodore | B64D 11/0696 | |
| 10,457,376 B1 * | 10/2019 | Koman | B64C 1/20 | |
| 2004/0036330 A1 * | 2/2004 | Itami | B60N 2/0248 | 297/243 |
| 2005/0211833 A1 * | 9/2005 | Frantz | B64C 1/20 | 244/118.1 |
| 2006/0102785 A1 * | 5/2006 | Butt | B64D 11/00 | 244/118.6 |
| 2007/0063122 A1 * | 3/2007 | Bowd | B64C 1/20 | 248/429 |
| 2008/0067726 A1 | 3/2008 | Rawson | | |
| 2009/0026827 A1 * | 1/2009 | Bishop | B60P 7/0815 | 297/463.1 |
| 2009/0230241 A1 * | 9/2009 | Heller | B60P 7/0815 | 244/118.1 |
| 2011/0043010 A1 * | 2/2011 | Diemer | B60N 2/07 | 297/217.3 |
| 2011/0049255 A1 * | 3/2011 | Penny | E01B 9/62 | 238/283 |
| 2013/0193296 A1 * | 8/2013 | Hoshi | B60N 2/0705 | 248/429 |
| 2014/0206302 A1 * | 7/2014 | Terada | H04B 7/24 | 455/90.1 |
| 2014/0224954 A1 * | 8/2014 | Oh | B60N 2/0705 | 248/429 |
| 2015/0115101 A1 * | 4/2015 | Thomaschewski | B64D 11/0696 | 244/118.6 |
| 2016/0083098 A1 * | 3/2016 | Lucas | B64D 11/0696 | 244/118.6 |
| 2018/0029714 A1 * | 2/2018 | Lucas | B64D 11/0696 | |

FOREIGN PATENT DOCUMENTS

| | | |
|---|---|---|
| DE | 102008010719 A1 | 8/2009 |
| DE | 102009014722 A1 | 9/2010 |
| DE | 102010036091 A1 | 3/2012 |
| DE | 102011000427 A1 | 8/2012 |
| DE | 102012208718 A1 | 11/2013 |

OTHER PUBLICATIONS

National Institute of Industrial Property, Preliminary Search Report and Written Opinion in French Republic Application No. FR1558955 dated Jan. 22, 2018.

German Patent and Trademark Office, Search Report for Application No. 10 2017 119 581.5, dated Jul. 20, 2018.

* cited by examiner

SEAT TRACK ASSEMBLIES FOR VIBRATION ISOLATION OF FLOOR MOUNTED COMPONENTS

CROSS-REFERENCE TO RELATED APPLICATIONS

This application claims the benefit of U.S. Provisional Application No. 62/369,703 filed Aug. 1, 2016. The disclosure of the above application is incorporated herein by reference.

TECHNICAL FIELD

The technical field relates generally to aircraft and seat track assemblies for vibration isolation of floor mounted components, and more particularly relates to aircraft isolators and mounting assemblies for isolators disposed within a seat track.

BACKGROUND

A conventional passenger aircraft includes a fuselage, a cabin interior attached to and/or supported by the fuselage, and a floor that defines a bottom of the cabin interior and is supported by the fuselage. As the aircraft is flown, the fuselage interacts with the atmosphere. This interaction generates vibration that travels through the floor to any components secured to the floor. The vibrating components, if left unchecked, will be perceived by occupants of the aircraft as noise, which is undesirable.

The noise generated by these vibrating components may be reduced by using a vibration isolation assembly. One conventional vibration isolation assembly rigidly mounts a support fitting to the floor, and then fastens the mounted component to the support fitting using a vibration isolator. These conventional assemblies have spatial constraints that limit the size of the vibration assemblies. Such limited size can limit the noise reduction potential of these conventional assemblies. Although these conventional vibration isolation assemblies are suitable for their intended purpose, there is room for improvement.

As such, it is desirable to provide improved aircraft and assemblies for vibration isolation of floor mounted components. In addition, other desirable features and characteristics will become apparent from the subsequent summary and detailed description, and the appended claims, taken in conjunction with the accompanying drawings and this background.

SUMMARY OF EMBODIMENTS

Various non-limiting embodiments of aircraft, vibration isolation assemblies, and methods of assembling vibration isolation assemblies are disclosed herein.

In a first non-limiting embodiment, a vibration isolation assembly includes, but is not limited to, a mounting track, a plate, a clamp block, a vibration isolator, and a support fitting. The mounting track defines a cavity and includes flanges that define an opening to the cavity. The plate is configured to be positioned on the flanges outside of the cavity. The clamp block is configured to be fastened to the plate under the flanges of the mounting track within the cavity. The vibration isolator is configured to be laterally constrained by the clamp block within the cavity and by the mounting track underneath the vibration isolator. The support fitting is configured to be secured to the vibration isolator outside of the cavity and to be separated from the plate and the clamp block.

In a second non-limiting embodiment, an aircraft includes a floor and a vibration isolation assembly secured to the floor. The vibration isolation assembly includes a seat track, a plate, a clamp block, a vibration isolator, and a support fitting. The seat track defines a cavity and includes flanges that define an opening to the cavity. The plate is positioned on the flanges outside of the cavity. The clamp block is fastened to the plate under the flanges of the seat track within the cavity. The vibration isolator is laterally constrained by the clamp block within the cavity. The support fitting is secured to the vibration isolator outside of the cavity and is separated from the plate and the clamp blocks.

BRIEF DESCRIPTION OF THE DRAWINGS

Advantages of the present invention will be readily appreciated, as the same becomes better understood, by reference to the following detailed description when considered in connection with the accompanying drawings wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Various non-limiting embodiments of aircraft, vibration isolation assemblies, and methods of assembling vibration isolation assemblies are disclosed herein. The embodiments include various configurations of an elastomer encapsulated inner member disposed within a cavity of a seat track in an aircraft. By utilizing the cavity in the seat track, the size of the elastomer and inner member interacting with the elastomer may be increased when compared with conventional vibration isolation assemblies with elastomeric material inside a compartment of an aircraft. The larger size permits greater vibration attenuation and less noise in the compartment of the aircraft. Additionally, the embodiments disclosed herein are able to attenuate the vibrations with a larger volume of elastomer to improve noise isolation performance over conventional assemblies. The embodiments described herein have lower height (less height protrusion) compared with conventional isolators for use in areas where flooring materials like carpet or hard wood floors limit the amount the fitting can rise above the floor in the cabin. A support fitting secured to the inner member is separated from (e.g., not in direct contact with) clamp blocks, a floor, and a plate by the elastomer. A greater understanding of the aircraft and vibration isolation assemblies may be obtained through a review of the illustrations accompanying this application together with a review of the detailed description that follows.

Figure 1:
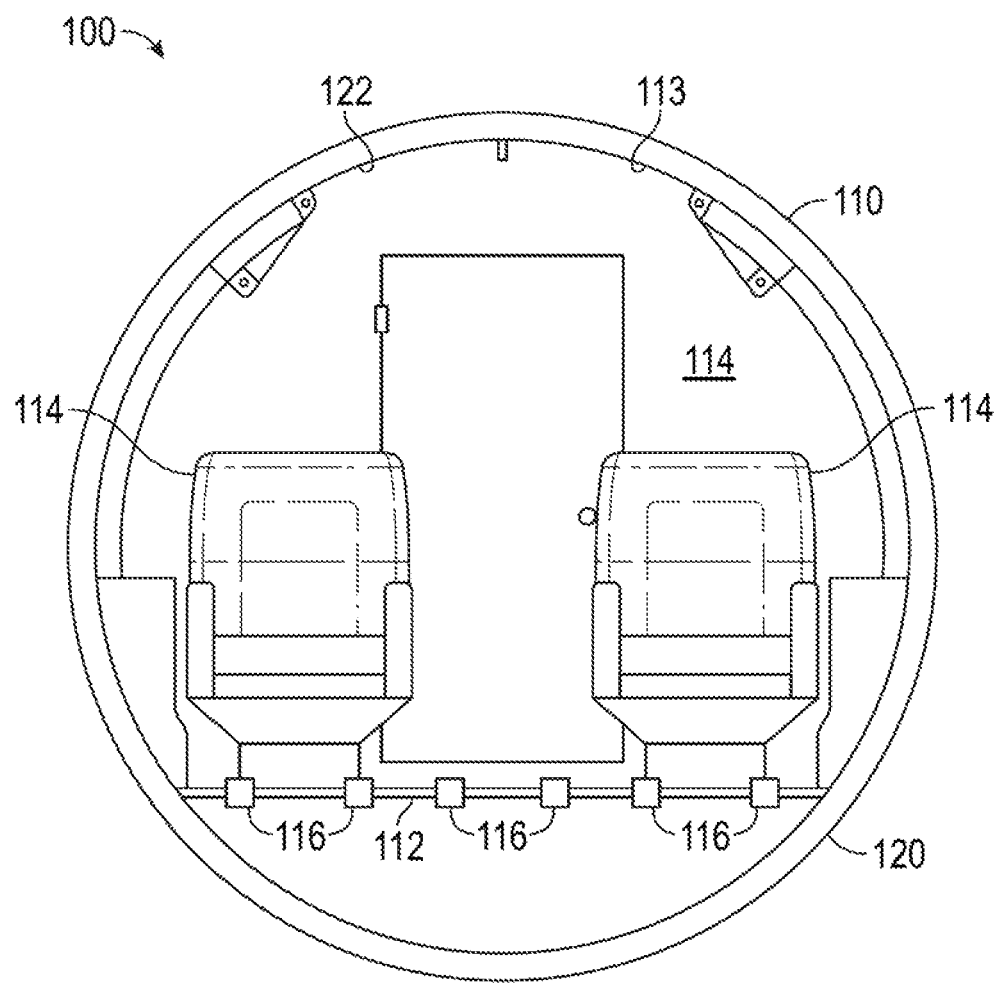
FIG. 1 is a cross section view illustrating a non-limiting embodiment of an aircraft with a vibration isolation assembly in accordance with teachings of the present disclosure.

Referring now to FIG. 1, an aircraft 100 is illustrated in various views in a cross sectional view in accordance with the teachings of the present disclosure. Aircraft 100 includes a fuselage 110, a floor 112, a compartment 113, floor mounted components 114, and a vibration isolation assembly 116 for each of the floor mounted components 114. In the example provided, aircraft 100 is a jet airplane. In other embodiments, aircraft 100 may be any other type of airborne vehicle, including, but not limited to, helicopters, propeller operated planes, or air ships without departing from the scope of the present disclosure.

Fuselage 110 includes an outer skin 120 and a frame structure 122 to which outer skin 120 is secured. Floor 112 includes a plurality of cross braces, a plurality of floor panels, and a plurality of seat tracks or mounting tracks that are also included in vibration isolation assembly 116. The arrangement of the cross braces, floor panels, and mounting tracks may have any suitable configuration based on the particular implementation, as will be appreciated by those with ordinary skill in the art. In general, floor 112 is secured to fuselage 110. Compartment 113 is a cabin, cockpit, or other area enclosed by floor 112 and fuselage 110.

Floor mounted components 114 include any components that are mounted to floor 112 by vibration isolation assembly 116. In the example provided, two passenger seats and a bulkhead are illustrated as floor mounted components 114. It should be appreciated that other components, such as cabinets, divans or couches, tables, drawers, toilet stanchions, or other floor mounted components may be mounted to floor 112 with vibration isolation assembly 116.

Figure 2A:
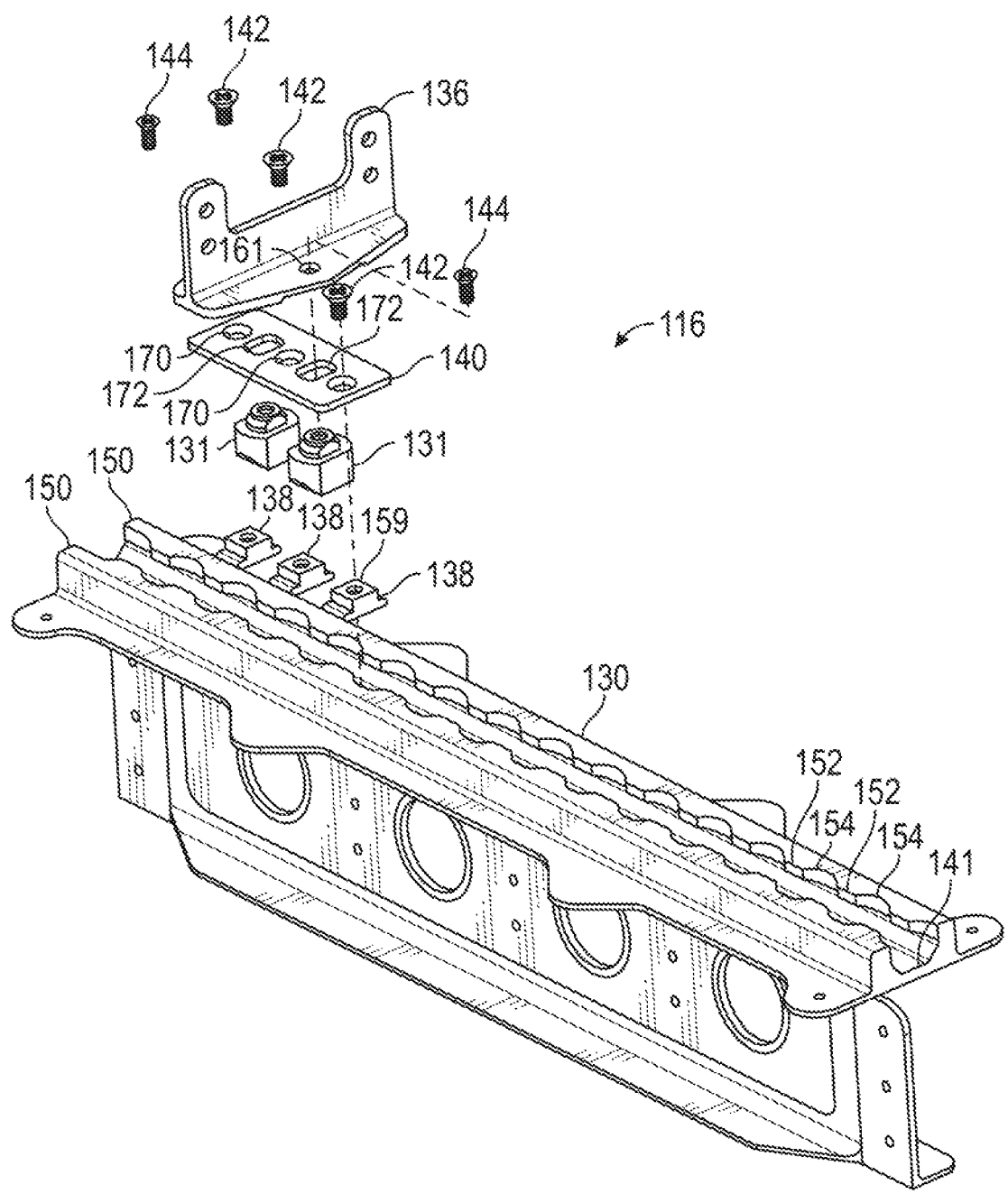
FIGS. 2A, 2B, and 2C are views illustrating a non-limiting embodiment of the vibration isolation assembly used in the aircraft of FIG. 1 in accordance with teachings of the present disclosure.
Figure 2B:
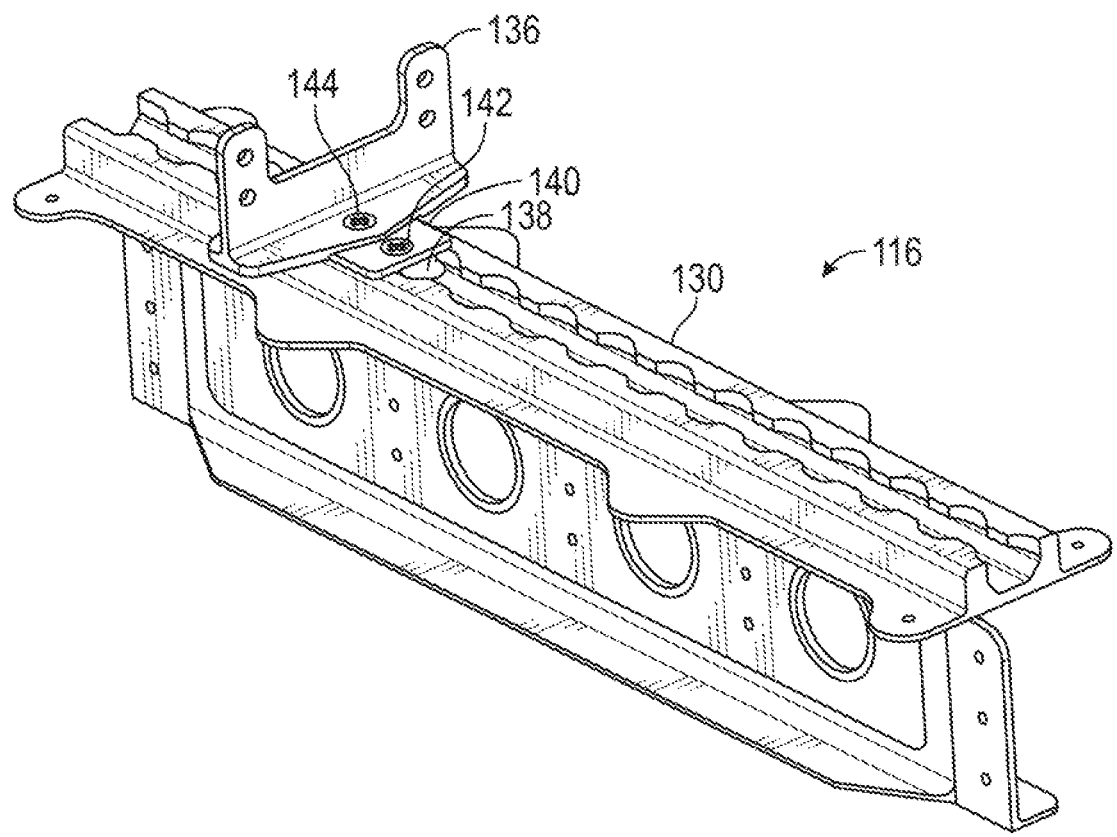
Figure 2C:
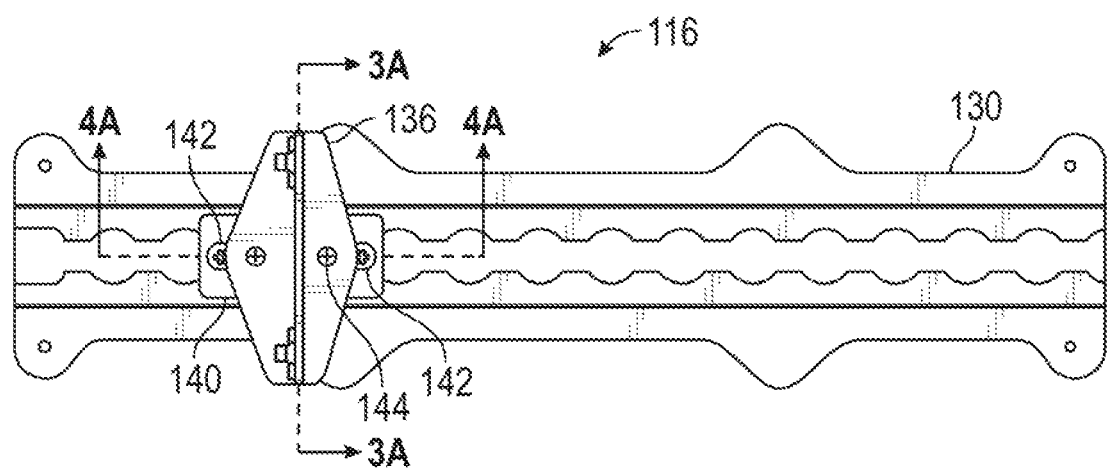

Referring now to FIGS. 2A-C, 3A-C and 4A-B, the vibration isolation assembly 116 is illustrated in greater detail. In FIGS. 2A, 2B, and 2C, an exploded isometric view, an assembled isometric view, and a top view, respectively are illustrated, while FIGS. 3A-C and 4A-B illustrate cross section views taken as indicated. In fundamental embodiments, vibration isolation assembly 116 includes a seat track 130, isolators 131, a support fitting 136, clamp blocks 138, plate 140, first fasteners 142, and second fasteners 144.

Seat track 130 is secured to fuselage 110 and is typically oriented to extend along a longitudinal direction of fuselage 110. In some embodiments, seat track 130 may be oriented in other directions, such as a lateral direction of fuselage 110. As used herein, the term "seat track" refers to a track configured to be secured to the floor structure of a vehicle, such as aircraft 100, and to which components are mounted. It should be appreciated that the components mounted to seat track 130 are not limited to seats. Seat track 130 is a type of mounting track. As used herein, the term "mounting track" refers to a track that is configured to mount components to the vehicle, but may be configured to be secured to any portion of the vehicle and may be oriented in any direction. In the example provided, four longitudinally oriented seat tracks 130 are spaced laterally within floor 112. It should be appreciated that any suitable number of seat tracks 130 may be utilized without departing from the scope of the present disclosure.

Seat track 130 is formed from a rigid material that defines a cavity 141 and an opening that faces a ceiling of aircraft 100 when installed in fuselage 110, as illustrated in FIG. 1. In the example provided, seat track 130 is an extruded aluminum track with a substantially c-channel shaped cross section that opens toward the ceiling of aircraft 100 in the installed position illustrated in FIG. 1. In other embodiments, seat track 130 may be steel, titanium, other metal materials, or other rigid non-metal materials. In the example provided, seat track 130 has a "peanut" configuration with upper flanges 150 having narrowed portions 152 between repeating half circle or "half moon" wider portions 154.

Seat track 130 may be secured within floor 112 by any suitable fasteners or connectors. For example, seat track 130 may be bolted or riveted to lateral cross members of floor 112 and may support floor boards of floor 112. Seat track 130 is secured to fuselage 110 through such cross members, and may be additionally secured to fuselage 110 at each longitudinal end of seat track 130.

In the example provided, two isolators 131 are utilized. It should be appreciated that for any given support fitting 136, additional isolators 131 may be provided by extending plate 140 and a lower portion of support fitting 136 along the longitudinal direction of seat track 130. For example, four, eight, or even more isolators 131 may be utilized for isolating large loads or heavy mounted components 114.

Figure 3A:
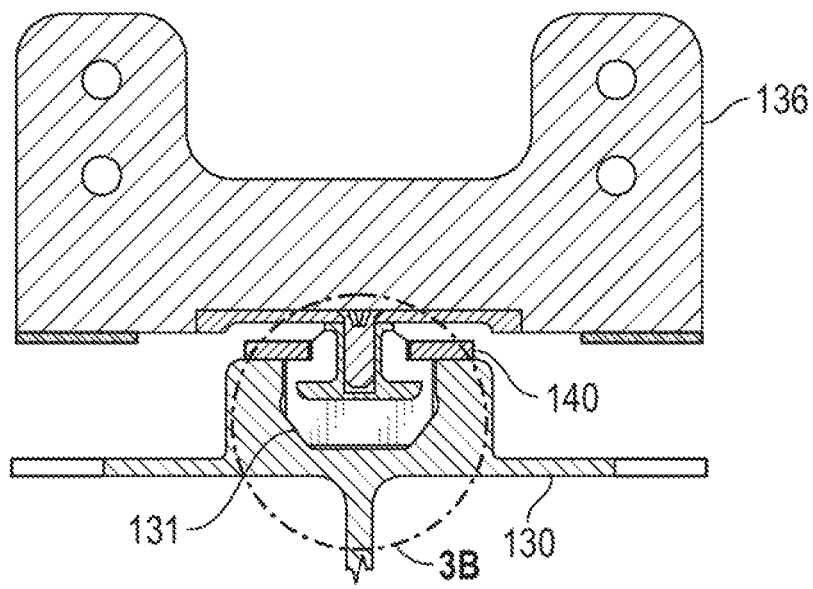
FIGS. 3A, 3B, 3C, 4A, and 4B are cross section and enlarged views of the vibration isolation assembly illustrated in FIGS. 2A-C.
Figure 3B:
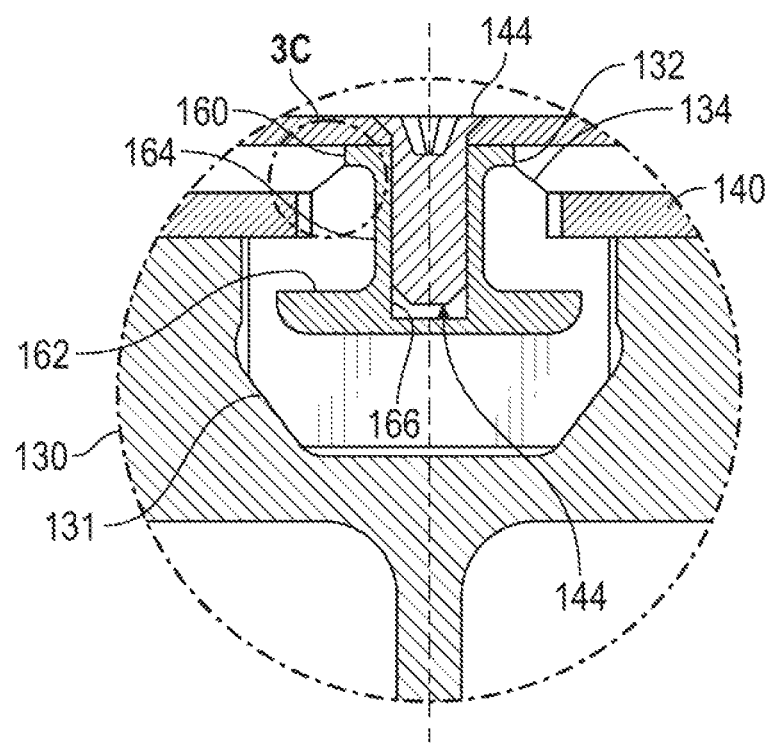
Figure 3C:
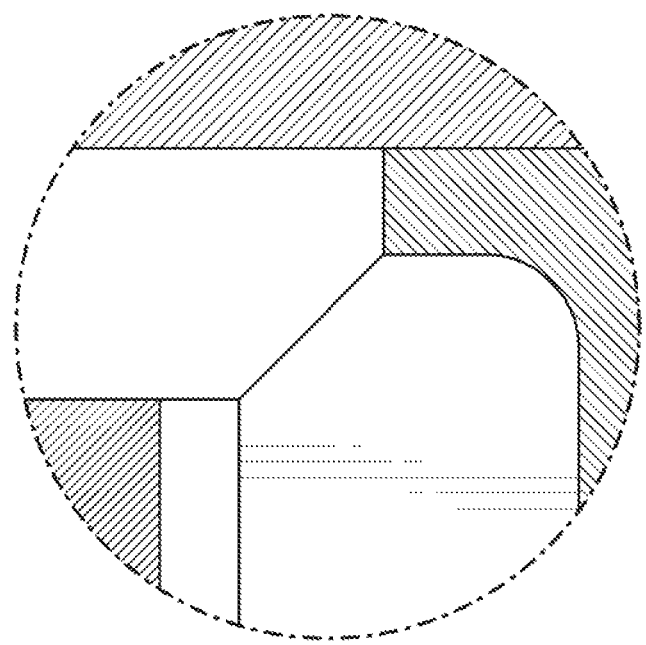
Figure 4A:
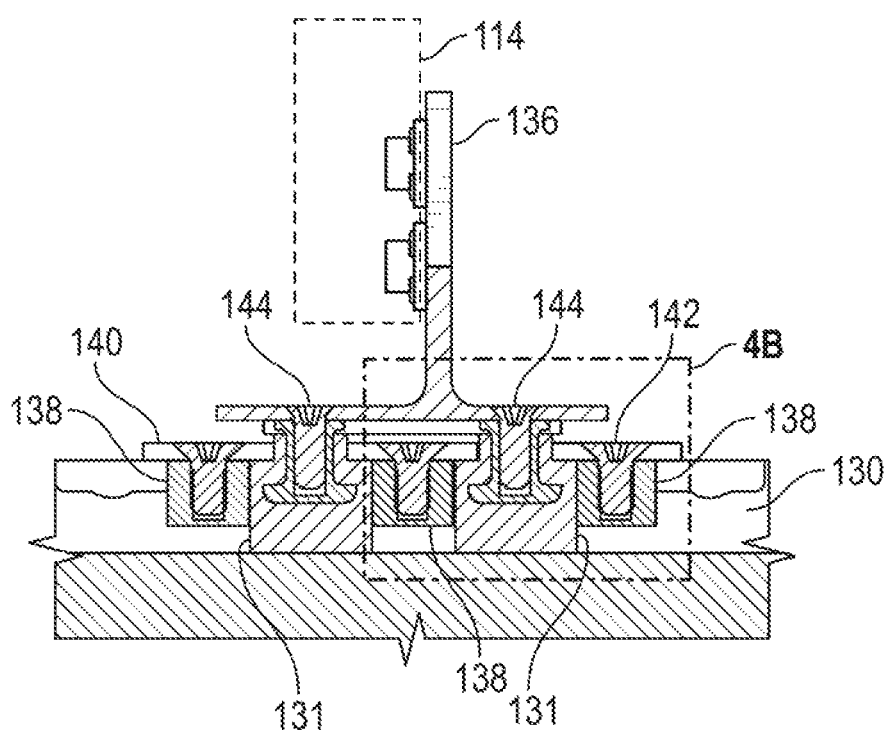
Figure 4B:
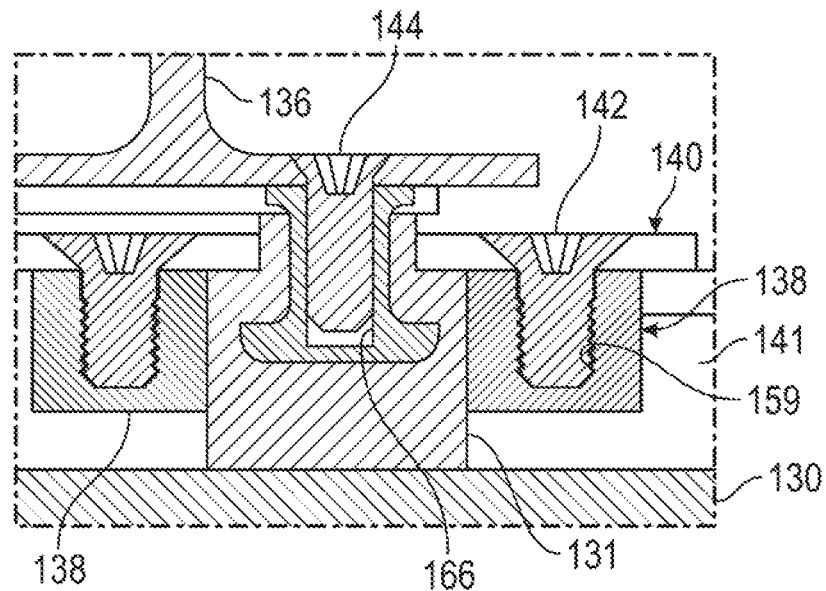

Isolators 131 each include an inner member 132 and an elastomer 134, as is best seen in FIG. 3B. Inner member 132 is formed from a rigid material and has an upper flange 160, a lower flange 162, and a post 164 between the upper and lower flanges. The rigid material of inner member 132 may be any suitable material, including, but not limited to, aluminum, steel, and other metals or stiff plastics. Lower flange 162 is disposed within cavity 141 and has a cross-sectional width that is larger than an opening in plate 140 through which isolator 131 extends. Upper flange 160 has a top surface facing away from the elastomer. The top surface is a bearing surface configured to support the support fitting 136. In some embodiments, upper flange 160 is omitted.

Post 164 defines a threaded bore 166 configured to mate with threads of second fasteners 144. It should be appreciated that post 164 may be configured to secure mounted components with other fasteners or arrangements. It should be appreciated that post 164 may utilize other suitable fastener configurations without departing from the scope of the present disclosure. In the example provided, threaded bore 166 is a blind hole to restrict over-compression of the elastomer by second fastener 144. In some embodiments, threaded bore 166 defines a through hole, and elastomer 134 includes a bore coaxial with threaded bore to accommodate fasteners that are too long for threaded bore 166. In some embodiments, threaded bore 166 is omitted and post 164 defines a threaded stud that may thread into plate 140 or pass through plate 140 to fasten with a nut.

Elastomer 134 is disposed in cavity 141 between plate 140 and seat track 130 to attenuate vibrations traveling from seat track 130 to inner member 132. Such attenuation reduces the vibration of support fitting 136 and mounted component 114 to reduce noise perceived by passengers of aircraft 100. The weight of mounted component 114 is primarily carried by compression of elastomer 134. The weight of mounted component 114 presses on support fitting 136, which presses on upper flange 160 of inner member 132 of isolator 131, which transfers the load through post 164 to lower flange 162. Lower flange 162 transfers the load to elastomer 134, which compresses against a bottom of cavity 141 of seat track 130. Elastomer 134 is also disposed to the sides of lower flange 162 to protect against side loads pushing the hard surfaces of lower flange 162 against seat track 130.

In the example provided, elastomer 134 encapsulates lower flange 162 and fills substantially the entire cross-sectional area of cavity 141 not occupied by inner member 132. A length of lower flange 162 and elastomer 134 along the longitudinal direction of seat track 130 may be selected according to the particular implementation. Because cavity 141 is within seat track 130, the length of lower flange 162 and elastomer 134 are not limited by available space within compartment 113 or by aesthetics. Accordingly, a larger lower flange 162 and elastomer may be implemented when compared with prior vibration isolation assemblies.

In the example provided, the elastomer is compressed primarily on the bottom 80% of elastomer 134. The depth or thickness of elastomer 134 between lower flange 162 and a bottom surface of cavity 141 is selected to provide vibration isolation that may be tailored for the weight of mounted component 114. In the example provided, the depth of elastomer 134 between lower flange 162 and the bottom surface of cavity 141 is about 0.25 inches. To further tailor vibration isolation capability, the elastomer compound or material with different durometers and different stiffnesses may be selected based on the load implemented. For example, some mounted components 114 may be better isolated with silicone as the elastomer 134 material, while other mounted components may be better isolated with rubber as the material.

An upper neck portion of elastomer 134 that extends through plate 140 provides isolation to protect against grounding out the embedded insert with the plate. In the example provided, elastomer 134 extends up past plate 140 to add durability to the elastomer. In some embodiments, elastomer does not extend above plate 140.

Support fitting 136 is formed from a metal or other rigid material for securing mounted components 114 to inner member 132. In the example provided, support fitting 136 includes a countersunk bore 161 to accommodate second fasteners 144 and provide a flush surface suitable for placement under carpet or other flooring on aircraft 100.

Clamp blocks 138 fasten under flange 150 of seat track 130 and hold plate 140 to the seat track. In the example provided, clamp block 138 defines threaded bores 159 that accommodate first fasteners 142. First fasteners 142 pull clamp block 138 towards plate 140 to compress flange 150 of seat track 130 between plate 140 and clamp block 138. Accordingly, shifting and movement of support fitting 136 and mounted component 114 is restricted by friction between flange 150 of seat track and plate 140 and clamp block 138.

Plate 140 is a strong, durable material that is wider than the opening in seat track 130. Plate 140 defines countersunk bores 170 for bearing against first fasteners 142 to secure clamp block 138. Plate 140 further defines bores 172 shaped to accommodate insertion of upper flange 160 of inner member 132. It should be appreciated that the countersunk feature of bores 161 and 170 may be omitted without departing from the scope of the present disclosure.

Figure 5:
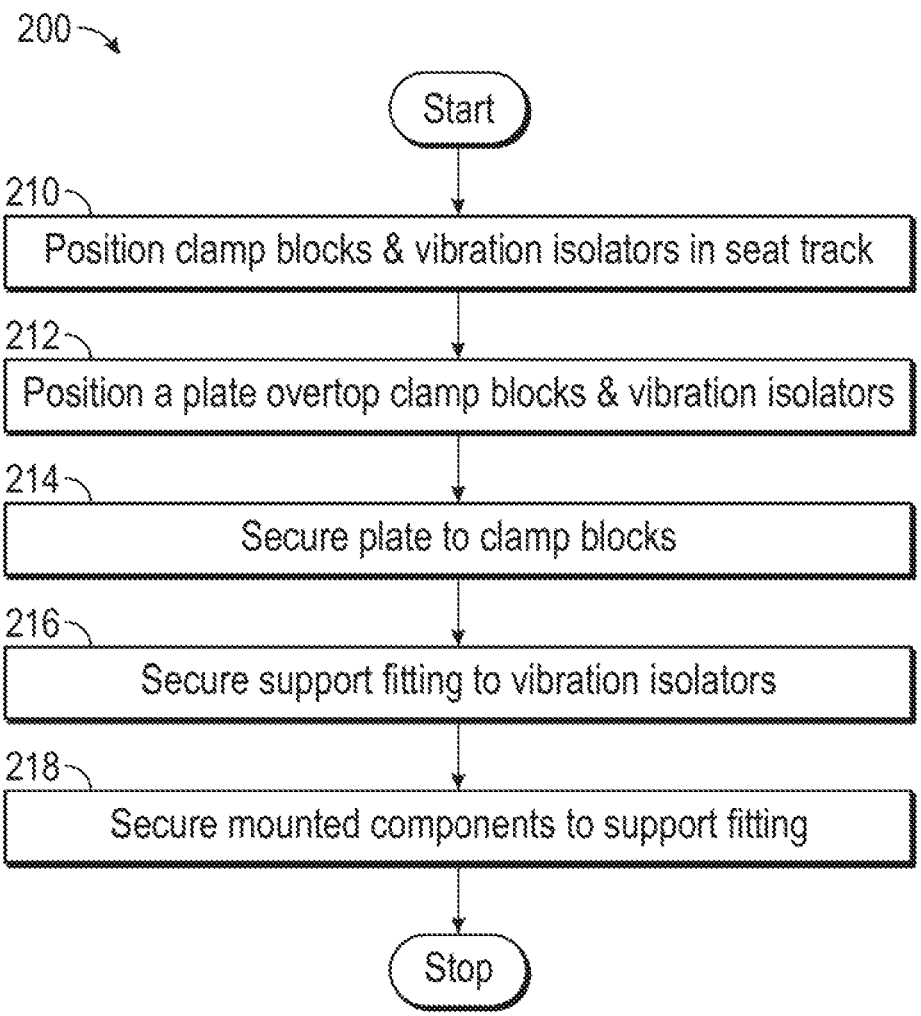
FIG. 5 is a flow diagram of a method of assembling a vibration isolation assembly in accordance with teachings of the present disclosure.
Figure 6:
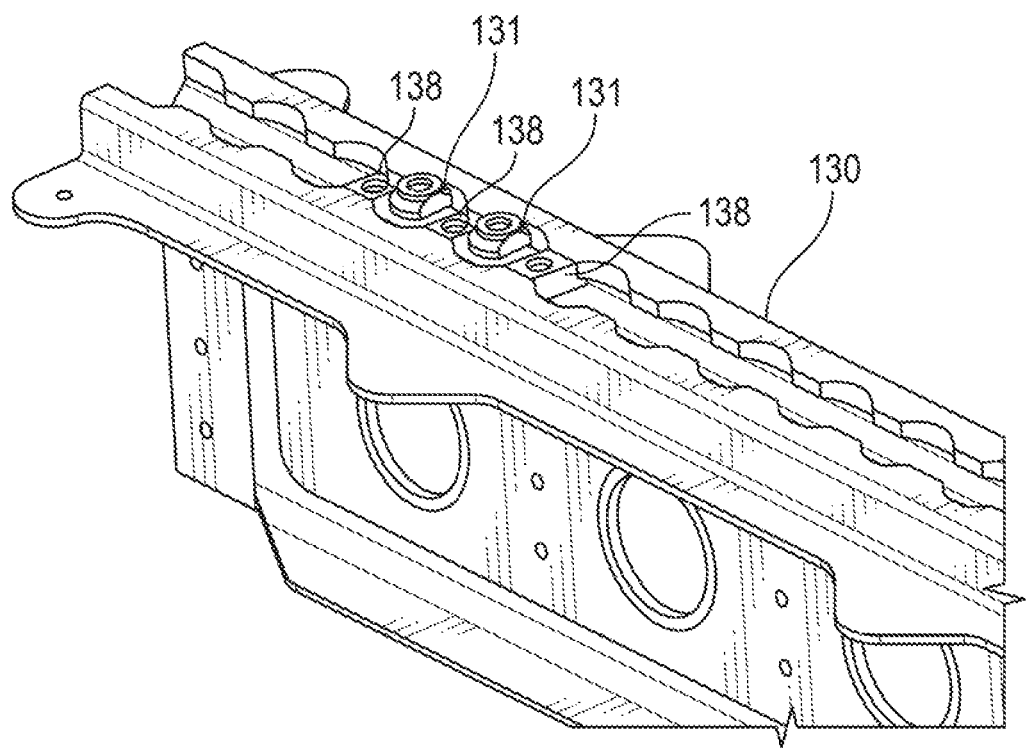
FIGS. 6 and 7 illustrate the vibration isolation assembly of FIGS. 2A-C in various states of assembly in accordance with the teachings of the present disclosure.
Figure 7:
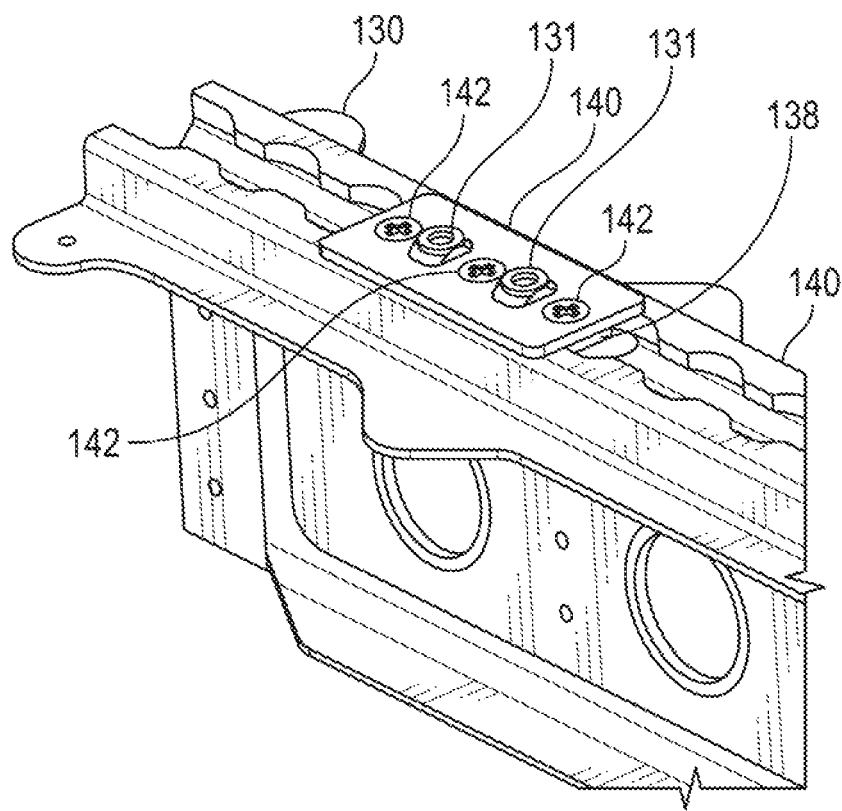

Referring now to FIGS. 5, 6, and 7, and with continuing reference to FIGS. 2A and 2B, a method 200 of assembling a vibration isolation assembly is illustrated. In operation 210, clamp blocks and vibration isolators are positioned in seat track 130. For example, clamp block 138 may be placed in wider portion 154 of seat track 130 and translated through cavity 141 along the longitudinal direction of seat track 130 to narrowed portion 152 once inserted. Vibration isolators 131 may then be placed into wider portions 154, as illustrated in FIG. 6.

In operation 212, a plate is placed on the seat track overtop the clamp block and the vibration isolators. For example, plate 140 may be placed on seat track 130 with countersunk bores 170 disposed over clamp block 138 and bores 172 disposed over isolators 131, as can be seen in FIG. 7.

In operation 214, the plate is secured to the seat track and the clamp blocks. For example, first fasteners 142 may be placed through countersunk bores 170 of plate 140, guided between narrowed portions 152 of seat track 130, and threaded into threaded bores 159 of clamp block 138.

In operation 216, a support fitting is secured to the vibration isolators. For example, support fitting 136 may be secured to vibration isolators 131 by guiding second fasteners 144 through countersunk bores 161 in support fitting 136 to thread into threaded bores 166 of vibration isolators 131. A head of second fastener 144 bears against countersunk bore 161 to compress support fitting against upper flange 160 of inner member 132.

In operation 218, mounted components are secured to the support fitting. For example, mounted components 114 may be secured to support fitting 136 in operation 218.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A vibration isolation assembly, comprising:
  a mounting track that defines a cavity and includes flanges that define an opening to the cavity, wherein the flanges define opposing semi-circular slots with alternating narrowed portions and wider portions of the opening;
  a plate configured for positioning on the flanges outside of the cavity, the plate comprising a first bore for a first fastener, and the plate comprising a second bore;
  a clamp block configured for holding the plate to the mounting track, the clamp block comprising a lower portion disposed in the cavity beneath one of the narrowed portions, and the clamp block configured to receive and engage the first fastener to compress the flanges of the mounting track between the plate and the lower portion of the clamp block;
  a vibration isolator positioned in one of the wider portions and configured for lateral constraint by the clamp block within the cavity, the vibration isolator comprising:
    a lower portion that is wider than the second bore of the plate, the lower portion of the vibration isolator positioned below the plate and in the cavity such that the plate holds the vibration isolator in place;
    an upper portion extending through the second bore of the plate and above the plate;
    an elastomer; and
    an inner member configured to receive and engage a second fastener; and
  a support fitting secured to the inner member of the vibration isolator with the second fastener, the support fitting located outside of the cavity and separated from the clamp block.

2. The vibration isolation assembly of claim 1, wherein the mounting track further defines a bottom surface of the cavity opposite the flanges, and wherein the vibration isolator is configured for vertical support by the bottom surface.

3. The vibration isolation assembly of claim 2, wherein the elastomer substantially encapsulates the inner member.

4. The vibration isolation assembly of claim 3, wherein the inner member includes a post and a lower flange, and wherein the support fitting is configured to couple with the post and the lower flange is configured for support by the bottom surface through the elastomer.

5. The vibration isolation assembly of claim 4, wherein the inner member further includes an upper flange with a top surface facing away from the elastomer, and wherein the top surface is configured to support the support fitting.

6. The vibration isolation assembly of claim 5, wherein the post defines a threaded bore configured to receive the second fastener, and wherein the support fitting defines a fitting bore to receive the second fastener and secure the support fitting to the inner member.

7. The vibration isolation assembly of claim 1, wherein the mounting track is a seat track configured for securing to a floor of an aircraft.

8. The vibration isolation assembly of claim 1, wherein the mounting track has a substantially c-channel shaped cross section.

9. An aircraft comprising:
a floor; and
a vibration isolation assembly secured to the floor, the vibration isolation assembly comprising:
  a seat track that defines a cavity and includes flanges that define an opening to the cavity, wherein the flanges define opposing semi-circular slots with alternating narrowed portions and wider portions of the opening;
  a plate positioned on the flanges outside of the cavity, the plate comprising a first bore for a first fastener, and the plate comprising a second bore;
  a clamp block fastened to the plate and holding the plate to the mounting track, the clamp block comprising a lower portion disposed in the cavity beneath one of the narrowed portions, and the clamp block configured to receive and engage the first fastener to compress the flanges of the mounting track between the plate and the lower portion of the clamp block;
  a vibration isolator positioned in one of the wider portions and laterally constrained by the clamp block within the cavity, the vibration isolator comprising:
    a lower portion that is wider than the second bore of the plate, the lower portion of the vibration isolator positioned below the plate and in the cavity such that the plate holds the vibration isolator in place;
    an upper portion extending through the second bore of the plate and above the plate;
    an elastomer; and
    an inner member configured to receive and engage a second fastener; and
  a support fitting secured to the inner member of the vibration isolator with the second fastener, the support fitting located outside of the cavity and separated from the clamp block and the floor.

10. The aircraft of claim 9, wherein the seat track further defines a bottom surface of the cavity opposite the flanges, and wherein the vibration isolator is vertically supported by the bottom surface.

11. The aircraft of claim 10, wherein the elastomer substantially encapsulates the inner member.

12. The aircraft of claim 11, wherein the inner member includes a post and a lower flange, and wherein the support fitting is coupled with the post and the lower flange is supported by the bottom surface through the elastomer.

13. The aircraft of claim 12, wherein the inner member further includes an upper flange with a top surface facing away from the elastomer, and wherein the top surface supports the support fitting and is separated from the plate and the floor.

14. The aircraft of claim 13, wherein the post defines a threaded bore that receives the second fastener, and wherein the support fitting defines a fitting bore through which the second fastener passes to secure the support fitting to the inner member.

15. The aircraft of claim 9, wherein the seat track has a substantially c-channel shaped cross section.

* * * * *